United States Patent [19]

Lorea

[11] 4,244,054
[45] Jan. 6, 1981

[54] METHOD AND APPARATUS FOR MEASURING THE AMPLITUDE AND THE GROUP DELAY FOR EACH SIDE-BAND OF AN AMPLITUDE MODULATED TRANSMITTER

[76] Inventor: Gianfranco Lorea, Corso Giambone 7, Turin, Italy

[21] Appl. No.: 893,189

[22] Filed: Apr. 3, 1978

[30] Foreign Application Priority Data

Aug. 31, 1976 [IT] Italy .................... 69118 A/76

[51] Int. Cl.$^3$ ............................................. H04B 1/02
[52] U.S. Cl. ............................ 455/115; 455/109; 324/77 C
[58] Field of Search ............. 325/133, 134, 363, 329, 325/67; 324/57 DE, 77 B, 77 C, 83 A; 455/67, 115

[56] References Cited

U.S. PATENT DOCUMENTS

| | | | |
|---|---|---|---|
| 2,635,183 | 4/1953 | Smith | 325/133 |
| 2,952,770 | 9/1960 | Downie | 325/133 |
| 3,337,804 | 8/1967 | Palatinus | 325/133 |
| 3,360,729 | 12/1967 | Oakatubys | 325/133 |
| 3,537,009 | 10/1970 | Brooks | 325/133 |
| 4,028,625 | 6/1977 | Behrend | 325/133 |

*Primary Examiner*—Robert L. Griffin
*Assistant Examiner*—Tommy F. Chin

[57] ABSTRACT

For measuring the group delay of amplitude modulated transmitters a variable measurement frequency is modulated by a fixed frequency so as to obtain the sum and difference frequencies which are sent to the input of the transmitter under test; the two waves corresponding to the same side-band are obtained at the transmitter output, are frequency shifted, filtered and detected to give their beat, filtered again to obtain only the beat at a frequency twice the modulation frequency; and said beat is compared with a signal of the frequency but coherent with the modulating signal, the comparison providing a direct voltage component which is a linear function of the group delay of the side-band corresponding to the measurement frequency. The invention also concerns the apparatus for realizing the method, comprising also the known units allowing to measure the amplitude of each side band.

5 Claims, 3 Drawing Figures

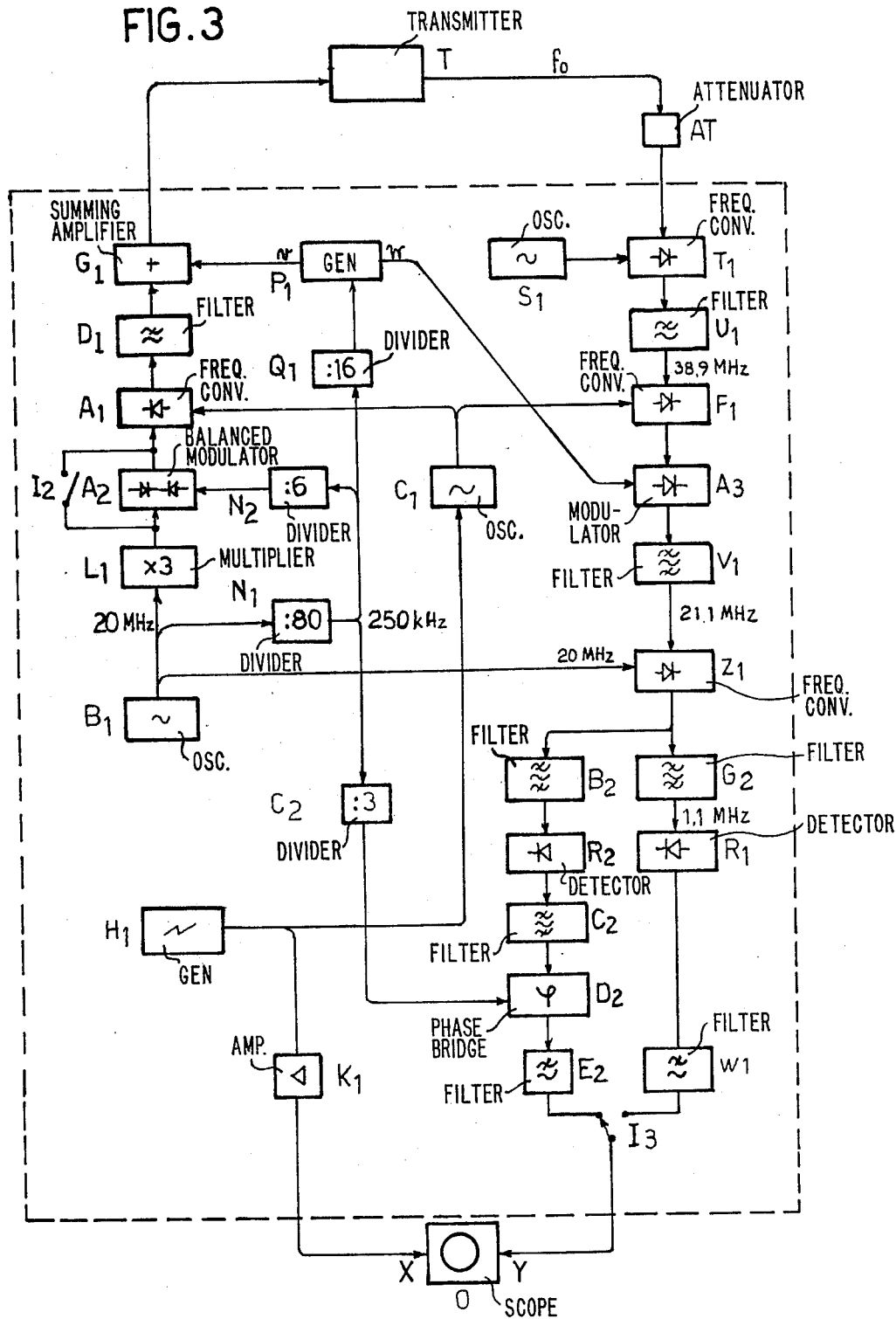

METHOD AND APPARATUS FOR MEASURING THE AMPLITUDE AND THE GROUP DELAY FOR EACH SIDE-BAND OF AN AMPLITUDE MODULATED TRANSMITTER

The present invention relates to a method and an apparatus for measuring the amplitude and the group delay for each side-band, from the input terminals to the output terminals of an amplitude modulated transmitter.

The known methods only permitted to separately analyse the amplitude of the two side-bands of an amplitude modulated transmitter: the transmitter input was fed with a variable frequency $f_v$ within the band utilized by the transmitter and this frequency was obtained as the beat of a fixed frequency oscillator and a variable frequency oscillator with central frequency equal to the fixed frequency of the first oscillator; the transmitter output, containing the carrier wave and the two side waves relative to the modulating signal applied to the input, was converted by said variable oscillator into a fixed frequency, which was filtered, detected and then applied to the vertical axis of an oscilloscope the horizontal axis of which was supplied with the voltage of a saw tooth generator controlling at the same time the variation of the frequency of said variable oscillator.

In the particular case of television transmitters, the input signal of the transmitter must also contain the television synchronism signals. This operation is performed by a suitable generator of the synchronism and the relevant pedestal onto which the signal to be sent to the transmitter under test is inserted.

Yet in this case there is the drawback that the frequency spectrum of the synchronizing signal and the relevant blanking gives rise to a considerable disturbance, particularly when the side-band portions near the carrier are analysed. Therefore this process only allows to analyse the behaviour of the amplitude versus the frequency of the transmitter side-bands and it does not provide for the analysis of the group delay.

The aim of the present invention is on the one hand to minimize the above mentioned disturbance, and on the other hand to introduce also the measurement of the group delay, separately for the two side-bands.

The process according to the invention, in a first embodiment, consists in: modulating the variable measurement frequency $f_v$ by a fixed frequency $f_g$ in a balanced modulator, that is a modulator which gives at the output only the two frequencies $f_v-f_g$ and $f_v+f_g$ which are sent to the input of the transmitter under test; frequency shifting the transmitter output in order to obtain therefrom, by filtering, the two waves corresponding to the same side-band; detecting said waves thereby to obtain the beat thereof; filtering such a beat to extract therefrom only the component at frequency $2 f_g$; comparing this frequency in a phase bridge or comparator with a signal also at frequency $2 f_g$, but coherent with the signal at frequency $f_g$ employed for the modulation of the balanced modulator; and extracting the d.c. component at the output of said bridge which component is a linear function of the group delay of the side-band corresponding to the measurement frequency.

According to a second embodiment of the invention, intended for testing a television transmitter, where the synchronisms are to be added to the measuring signal, the process also consists in modulating the output signal of the transmitter, by making it zero during the line blanking period and keeping it constant during the active portion of the line, the passage from one condition to the other being gradual.

Also in stating the features of the apparatus according to the invention the two cases of a generic transmitter and a television transmitter will be considered.

In the first case the apparatus comprises besides the known unit described at the beginning of the specification and measuring the amplitude versus the frequency, the devices necessary to measure the group delay, said devices substantially consisting of a balanced modulator and a phase comparing bridge operating at a frequency twice the frequency employed to modulate said balanced modulator.

In the second case, concerning the television transmitter, the apparatus also comprises a modulator, connected in the path of the radio-frequency output signal of the transmitter before any filter substantially limiting the band thereof, said modulator being characterized in that it is controlled by a pilot signal synchronous with the television signal and capable of bringing to zero the radiofrequency signal during the blanking period yet leaving it constant in the active portion of the line, the passage from one condition to the other being gradual.

The invention will be disclosed in greater detail with reference to the annexed drawings in which:

FIG. 3 is the circuit diagram of a preferred embodiment of the apparatus according to the invention.

Figure 1:
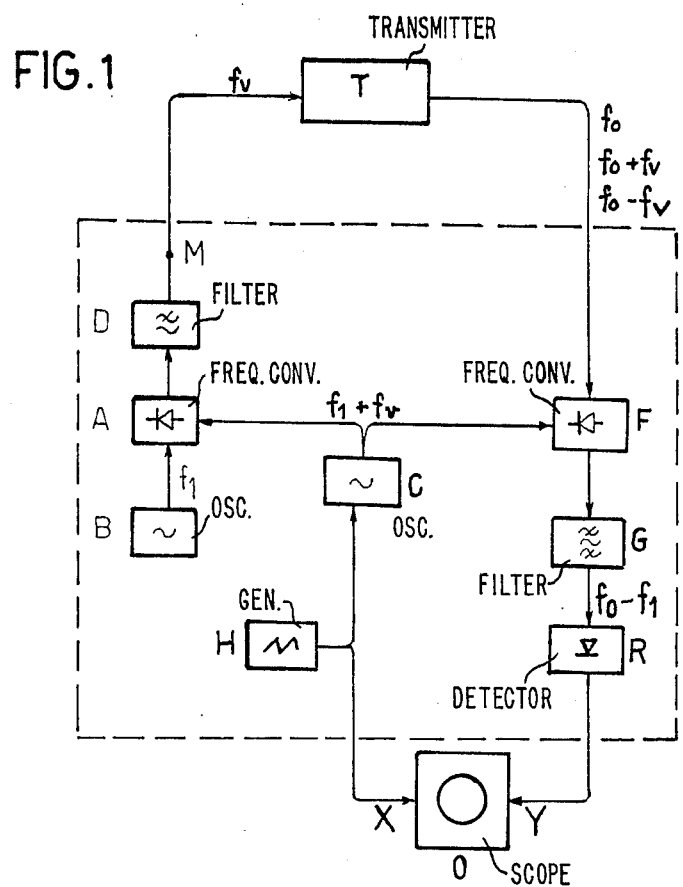
FIG. 1 is a block diagram of a known apparatus for measuring only the side-band amplitude.

As shown in the drawings (FIG. 1) according to the known technique a transmitter T under test is modulated by a sinusoidal signal at low frequency $f_v$ obtained from a frequency converter A which is fed by an oscillator B at a fixed radiofrequency $f_1$ and by an oscillator C at a variable radiofrequency $f_1+f_v$, where $f_v$ can have also negative values.

In this description the term "frequency converter" denotes any device which, being supplied with two or more than two signals at different frequencies provides at its output at least one of those signals of which the frequency is the sum or the difference of the frequencies of two input signals and the amplitude is proportional to the amplitude of at least one of the input signals.

A low pass filter D at the output of frequency converter A eliminates the remaining undesired beat frequencies.

The output signal of transmitter T, suitably attenuated, is sent to a second frequency converter F which also receives the signal from variable oscillator C.

Being $f_o$ the carrier frequency of the transmitter, if $f_v > f_o$ the frequency of the lower side-band is $f_o - f_v$ and that of the upper sideband is $f_o + f_v$.

By means of band pass filter G, one frequency among the various frequencies outcoming from frequency converter F is selected; the selected frequency, which must contain $f_1$ and not $f_v$, have amplitude proportional to the signal coming from the transmitter and constant value, for instance $f_o - f_1$, is then amplitude detected in linear detector R. The amplitude of the direct voltage obtained is proportional to the amplitude of the transmitter side wave at frequency $f_o + f_v$: in fact $f_o - f_1 = (f_o + f_v) - (f_1 + f_v)$, that is it is equal only to the frequency of the upper side-band if $f_v > 0$ or of the only lower side band if $f_v < 0$; in both cases the absolute value of the modulating frequency is the same, that is $|f_v|$.

To obtain the behaviour of the amplitude versus frequency characteristic of the transmitter, it is therefore sufficient to cause the frequency of oscillator C to vary from $f_1+f_{max}$ to $f_1-f_{max}$ ($f_{max}$ being the maximum modulating frequency of the transmitter) and to detect at the same time the amplitude of the direct voltage provided by detector R.

FIG. 1 only shows the basic theoretical scheme: in the practice some conversions and filters will have to be added to make easier the testing of transmitters at different frequencies by using a same apparatus, to realize the band pass filter G at a suitable frequency and to minimize the disturbing effect of undesired frequencies produced at the various conversions.

In order to make the measurement easier and quicker, usually the direct voltage supplied by detector R is sent to axis Y of an oscilloscope O, whose axis X is supplied by a saw tooth voltage generator H which produces at the same time the frequency variation of variable oscillator C.

Figure 2:
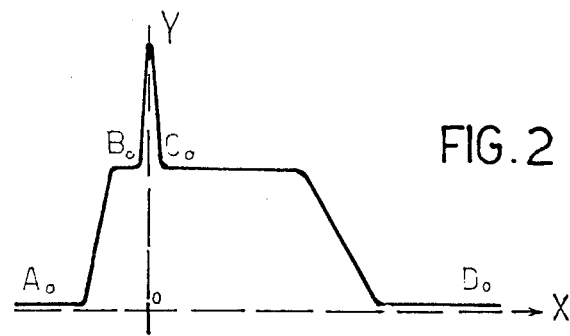
FIG. 2 is the oscilloscope pattern of the amplitude versus the frequency of a television transmitter.

FIG. 2 shows the pattern observed at the oscilloscope when for instance a television video transmitter with partly suppressed side-band is examined. The frequency and amplitude scales are placed along axis X and axis Y, respectively. Portion $A_oB_o$ shows the behaviour of the lower side-band, $C_oD_o$ relates to the upper side-band. Between $B_o$ and $C_o$ there is a peak corresponding to the carrier frequency. The horizontal width of such a peak is essentially determined by the bandwidth of filter G in FIG. 1.

At present however the modulating signal comprising only the sinusoidal voltage at variable frequency $f_v$ is not suitable for testing television video transmitters, as normally this signal does not allow the correct transmitter operation. It is necessary that the transmitter is modulated by a television-type signal in which the frame synchronization signal is suitably blanked. The modulating signal comprises therefore the line synchronizing signals with the relevant blanking and a pedestal on which the sinusoidal signal at frequency $f_v$ is superimposed. This operation may be performed by a mixer connected in point M in FIG. 1 between filter D and the transmitter input, by employing the signal outgoing from low pass filter D and the line synchronism signals and the relative blanking, generated in a device which can be incorporated together with the mixer into the apparatus of FIG. 1.

FIG. 3 shows a preferred embodiment of the apparatus performing the methods hereinbefore described for the measurement on video transmitters. In the drawing, reference T denotes the transmitter under test, and the measuring apparatus is within the dotted line rectangle. B1 is a fixed oscillator at 20 MHz whose signal is fed to the frequency triplicating circuit L1 to obtain a 60 MHz signal which, for the amplitude versus frequency measurement, feeds frequency converter A1 through switch I₂. For the group delay versus frequency measurement, balanced modulator A2 is connected between L1 and A1. The modulator is thus piloted by the above mentioned signal at 60 MHz and modulated by a sinusoidal signal at 41.6̄ kHz; this signal is obtained by dividing by 6 in divider N2 a signal at 250 kHz coming from divider N1, which in turn divides by 80 the signal at 20 MHz of oscillator B1.

Converter A1 is also fed by variable frequency oscillator C1, whose frequency is varied in linear way by means of a saw tooth voltage obtained from generator H1 and amplitude and frequency adjustable. Normally the amplitude of the saw tooth voltage is adjusted so that the frequency of oscillator C1 varies from 50 to 70 MHz and the saw tooth frequency is of some tens Hz to allow the measure to be observed on an oscilloscope. The same saw tooth voltage generator H1 feeds, through amplifier K1, the axis X of the oscilloscope.

When the amplitude is measured, the output signal of converter A1, filtered by low pass filter with cut off frequency at 15 MHz, is formed by a single sinusoidal signal with a frequency linearly varying from 0 to 10 MHz and vice versa, according to the frequency variation of oscillator C1.

When the group delay is measured, the output signal of D1 is formed by a pair of sinusoidal signals at frequencies $f_v-f_g$ and $f_v+f_g$, where $f_g$ is 41.6̄ kHz and $f_v$ is still the frequency varying between 0 and 10 MHz.

The output signal of filter D1 is sent to mixer G1 and is inserted by said mixer onto the pedestal of a television-type signal, comprising line synchronism signals with the relevant blanking and an amplitude adjustable pedestal. This television signal is obtained at output v of generator P1 which is synchronized through a signal at a frequency 15.625 Hz coming from frequency divider Q1 dividing by 16 the aforesaid signal at 250 kHz. The signal outgoing from G1 is sent to the input of the transmitter under test.

The output signal of the transmitter, with carrier frequency $f_o$, is suitably attenuated in attenuator AT and then enters the measuring apparatus in frequency converter T1 also receiving the signal of oscillator S1 at frequency $f_o+38.9$ MHz.

Converter T1 feeds low pass filter U1 with cut off frequency at 75 MHz. The output signal of U1 has carrier frequency 38.9 MHz and is fed to frequency converter F1, also receiving the signal from oscillator C1. The output signal of F1 is sent to band pass filter V1 through modulator A3, which performs the method for minimizing the noises caused by the synchronism and blanking signals.

The modulating signal is supplied by generator P1 and is trapezoid shaped. The intervals at negative and constant voltage begin in correspondence of the beginning of the line blanking signals and have a duration of about 24 μs. The intervals at positive voltage are joined to the preceding negative intervals by ramps shaped at the ends and having a duration of 4 μs. The basic signal frequency is 15,625 Hz. By means of band pass filter V1 the signal at 21.1 MHz is selected from the output signal of modulator A3. The selected signal is formed by a single wave at that frequency during the amplitude measurements, and by the pair of frequencies $21.1+f_g$ and $21.1-f_g$ during the group delay measurements. The output signal of filter V1 feeds the subsequent frequency converter Z1 also fed by oscillator B1 with a signal at 20 MHz.

When the amplitude is measured, the signal at 1.1 MHz supplied by Z1 is filtered by band pass filter G2. This one has a bandwidth of about 30 kHz, and its nominal central frequency at 1.1 MHz may be upwards or downwards shifted by about 60 kHz to compensate for possible small errors in the various oscillators employed in the apparatus.

The signal supplied by filter G2 is detected in a linear amplitude detector R1 whose output is fed to axis Y of the monitoring oscilloscope through a low pass filter W1, with constant phase and strong attenuation past 15,000 Hz, and switch I₃.

When the group delay is measured, the signal coming from converter Z1 and comprising frequencies $1.1-f_g$ and $1.1+f_g$ MHz is sent to a filter B2 having two response peaks in correspondence of those frequency values. At the filter output detector R2 detects the beat at 83.3 kHz between the two aforesaid frequencies.

The signal at 83.3 kHz passes through a band pass filter C2, with central frequency at 83.3 kHz and bandwidth of about 2 kHz and is then compared in the phase bridge D2 with a signal at 83.3 kHz coming by divider C2 which divides by 3 the above mentioned signal at 250 kHz.

The direct voltage component of the phase bridge is filtered by a filter E2 with constant phase and strong attenuation past 5 kHz and is sent to axis Y of the oscilloscope through switch I3 for the group delay measurement. Constant phase filters E2 and W1 eliminate the disturbing frequencies caused by the fact that the measuring signal is periodically interrupted by the line blanking signal, and reduce to a minimum the disturbance in the signal sent to oscilloscope O for being measured.

From the above description it is apparent that the apparatus shown in FIG. 3 may either analyse the behaviour of the amplitude versus the frequency for each side-band or respectively it may measure the group delay, also for each side-band.

In the first case switch I2 is kept closed and switch I3 closes the circuit towards the right; in the second case switch I2 is open and switch I3 closes the circuit towards the left, as shown in the drawing.

What we claim is:

1. A method of measuring the group delay in each sideband, from the input terminals to the output terminals of an amplitude modulated transmitter, characterized in that it comprises the steps of: generating two input waves having frequencies respectively equalling the sum and the difference of a variable frequency $f_v$ and a fixed frequency $f_g$, which are sent to the input of the transmitter under test; selecting at the transmitter output the two output waves corresponding to the input wave of the same side-band; frequency shifting, filtering and detecting said output waves so as to extract therefrom a beat signal at frequency $2 f_g$; comparing said beat frequency signal in a phase bridge comparator with another signal also at a frequency of $2 f_g$ but which is coherent with the signal at said frequency $f_g$; obtaining a signal at the output of said phase bridge whose voltage is a linear function of the group delay.

2. A method according to claim 1, wherein the transmitter is a transmitter for television signals, characterized in that it further comprises the step of modulating the transmitter output signal in a manner whereby the output signal is zero during a first blanking period and is kept constant during a second active period, and wherein the change from one period to the other is gradual.

3. In a side band analyser for an amplitude-modulated transmitter with a unit for the measurement of the amplitude versus frequency response, said transmitter having input and output terminals, said amplitude versus frequency measuring unit comprising: first signal generating means for generating a first radiofrequency signal at a first fixed frequency $f_1$; second signal generating means for generating a second radiofrequency signal at a variable frequency which is the sum of said first, fixed frequency and of a second, variable frequency $f_1+f_v$ within the transmitter band; frequency converting means connected to said first and second signal generating means and providing a beat of said first and second radio-frequency signals; first filter means connected to said first frequency converting means for extracting from said beat a signal at said second, variable frequency; second frequency converting means having inputs connected to the output terminals of the transmitter and to the second signal generating means, and generating as output signal a beat of signals present at its inputs; second filter means connected past said second frequency converting means and extracting from the output signal thereof a component having a frequency depending upon said first, fixed frequency and independent from said second variable frequency; first amplitude detecting means for providing d.c. signals having amplitudes proportional to the amplitudes of the transmitter sideband; and display means for said d.c. signal: the improvement comprising a device for measuring the group-delay versus frequency response, for each side band of the transmitter, said device comprising:

(a) a balanced modulator insertable between said first signal generating means and said first frequency converting means, said modulator being driven by said first radio-frequency signal, being modulated by a sinusoidal signal at a third, fixed frequency $f_g$ and providing as output signals two sinusoidal signals having frequencies respectively equalling the sum and the difference of the frequencies of the driving and modulating signals, said two sinusoidal signals being fed to the transmitter input through said first frequency converting means and first filter means and resulting into two output signals of the transmitter;

(b) second detection means, connected through a third filter means to said second frequency converting means and generating a beat of said two transmitter output frequencies, converted in said second frequency converting means and filtered in said third filter means; and (c) phase comparing means, connected after the second detecting means through a fourth filter means for comparing the phase of said beat with that of a signal coherent with the modulating signal and having a double frequency; said phase comparing means generating a signal which is a linear function of the group delay, said phase comparing means having an output connectable to said display means.

4. A device as claimed in claim 3, further comprising first switch means connected in parallel to said balanced modulator for cutting it off during the measurement of the amplitude versus frequency response and inserting it during the measurement of the group delay versus frequency response, and second switch means connecting to said display means either said amplitude detecting means, when the amplitude versus frequency response is measured, or said phase comparing means, when the group delay versus frequency response is measured.

5. A device as claimed in claim 3, wherein said transmitter is a transmitter of video signals which are organized in a frame of lines comprising active periods and blanking periods, the device further comprising:

(a) means for generating an amplitude adjustable pedestal of said video signals;

(b) a summing amplifier connected between said first filter means and the transmitter input, for inserting said sinusoidal signal at the second, variable frequency onto said pedestal; and (c) a further modulator connected between said second frequency converting means and said second filter means, said modulator being fed by a signal driven by said pedestal and providing a signal whose amplitude is zero in the line blanking periods and has a constant value in the active periods of a line, with gradual transition from one value to the other.

* * * * *